United States Patent
Ruiz et al.

(10) Patent No.: US 11,972,303 B2
(45) Date of Patent: Apr. 30, 2024

(54) METHODS, APPARATUS, AND SYSTEMS TO DYNAMICALLY SCHEDULE WORKLOADS AMONG COMPUTE RESOURCES BASED ON TEMPERATURE

(71) Applicant: Intel Corporation, Santa Clara, CA (US)

(72) Inventors: Carin Ruiz, Portland, OR (US); Bo Qiu, Hillsboro, OR (US); Columbia Mishra, Beaverton, OR (US); Arijit Chattopadhyay, Folsom, CA (US); Chee Lim Nge, Beaverton, OR (US); Srikanth Potluri, Folsom, CA (US); Jianfang Zhu, Hillsboro, OR (US); Deepak Samuel Kirubakaran, Hillsboro, OR (US); Akhilesh Rallabandi, Chandler, AZ (US); Mark Gallina, Hillsboro, OR (US); Renji Thomas, Hillsboro, OR (US); James Hermerding, II, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 16/914,177

(22) Filed: Jun. 26, 2020

(65) Prior Publication Data
US 2020/0326994 A1  Oct. 15, 2020

(51) Int. Cl.
*G06F 9/50*    (2006.01)
*G06F 9/48*    (2006.01)
*G06F 11/30*   (2006.01)

(52) U.S. Cl.
CPC .......... *G06F 9/5094* (2013.01); *G06F 9/4881* (2013.01); *G06F 9/505* (2013.01); *G06F 11/3058* (2013.01); *G06F 2209/508* (2013.01)

(58) Field of Classification Search
CPC ...... G06F 9/5094; G06F 9/4881; G06F 9/505; G06F 11/3058; G06F 2209/508; G06F 11/3062; G06F 11/3096; Y02D 10/00
See application file for complete search history.

(56) References Cited

U.S. PATENT DOCUMENTS

| | | | |
|---|---|---|---|
| 2009/0271141 A1* | 10/2009 | Coskun | G06F 1/206 |
| | | | 702/191 |
| 2013/0166885 A1* | 6/2013 | Ramani | G06F 9/4893 |
| | | | 712/214 |

(Continued)

OTHER PUBLICATIONS

European Patent Office, "Communication pursuant to Artcile 94(3) EPC," issued in connection with European Patent Application No. 20216697.1, dated Apr. 13, 2023, 9 pages.

(Continued)

*Primary Examiner* — Kenneth Tang
(74) *Attorney, Agent, or Firm* — Hanley, Flight and Zimmerman, LLC

(57) ABSTRACT

Methods, apparatus, and systems to dynamically schedule a workload to among compute blocks based on temperature are disclosed. An apparatus to schedule a workload to at least one of a plurality of compute blocks based on temperature includes a prediction engine to determine (i) a first predicted temperature of a first compute block of the plurality of compute blocks and (ii) a second predicted temperature of a second compute block of the plurality of compute blocks. The apparatus also includes a selector to select between the first compute block and the second compute block for assignment of the workload. The selection is based on which of the first and second predicted temperatures is lower. The apparatus further includes a workload scheduler to assign the workload to the selected one of the first or second compute blocks.

24 Claims, 12 Drawing Sheets

(56) References Cited

U.S. PATENT DOCUMENTS

| | | | |
|---|---|---|---|
| 2013/0219230 A1 | 8/2013 | Best et al. | |
| 2015/0227391 A1* | 8/2015 | Paul | G06F 1/3206 |
| | | | 718/102 |
| 2016/0350117 A1* | 12/2016 | Muller | G06F 11/3433 |
| 2017/0109205 A1* | 4/2017 | Ahuja | G06F 9/5094 |
| 2017/0371719 A1* | 12/2017 | Majumdar | G06F 9/5094 |
| 2018/0026906 A1* | 1/2018 | Balle | G06F 12/1408 |
| | | | 709/226 |
| 2020/0037473 A1* | 1/2020 | Kommula | G05B 13/048 |
| 2020/0073726 A1 | 3/2020 | Lee et al. | |
| 2020/0097322 A1* | 3/2020 | Kraemer | G06F 9/4893 |
| 2020/0192705 A1 | 6/2020 | Rao et al. | |

OTHER PUBLICATIONS

European Patent Office, "Extended European Search Report," mailed in connection with European Patent Application No. 20216697.1, dated May 19, 2021, 9 pages.

* cited by examiner

METHODS, APPARATUS, AND SYSTEMS TO DYNAMICALLY SCHEDULE WORKLOADS AMONG COMPUTE RESOURCES BASED ON TEMPERATURE

FIELD OF THE DISCLOSURE

This disclosure relates generally to scheduling workloads among compute resources, and, more particularly, to dynamically scheduling workloads among compute resources based on temperatures.

BACKGROUND

In recent years, computer processing unit (CPU) architecture has and continues to undergo significant changes. For example, a CPU no longer includes only a CPU core but also includes several other types of compute engines such as a graphics processing unit(s) (GPU), and dedicated neural compute engines such video processing units (VPU) and Gaussian Neural Accelerator (GNA) units. Other compute engines such the Integrated processing unit (IPU), a universal serial bus type C connector, etc., are also now part of CPU architecture. In addition, next generation CPU architecture will have hetero compute using multiple big cores and Atom® cores.

Figure 1:
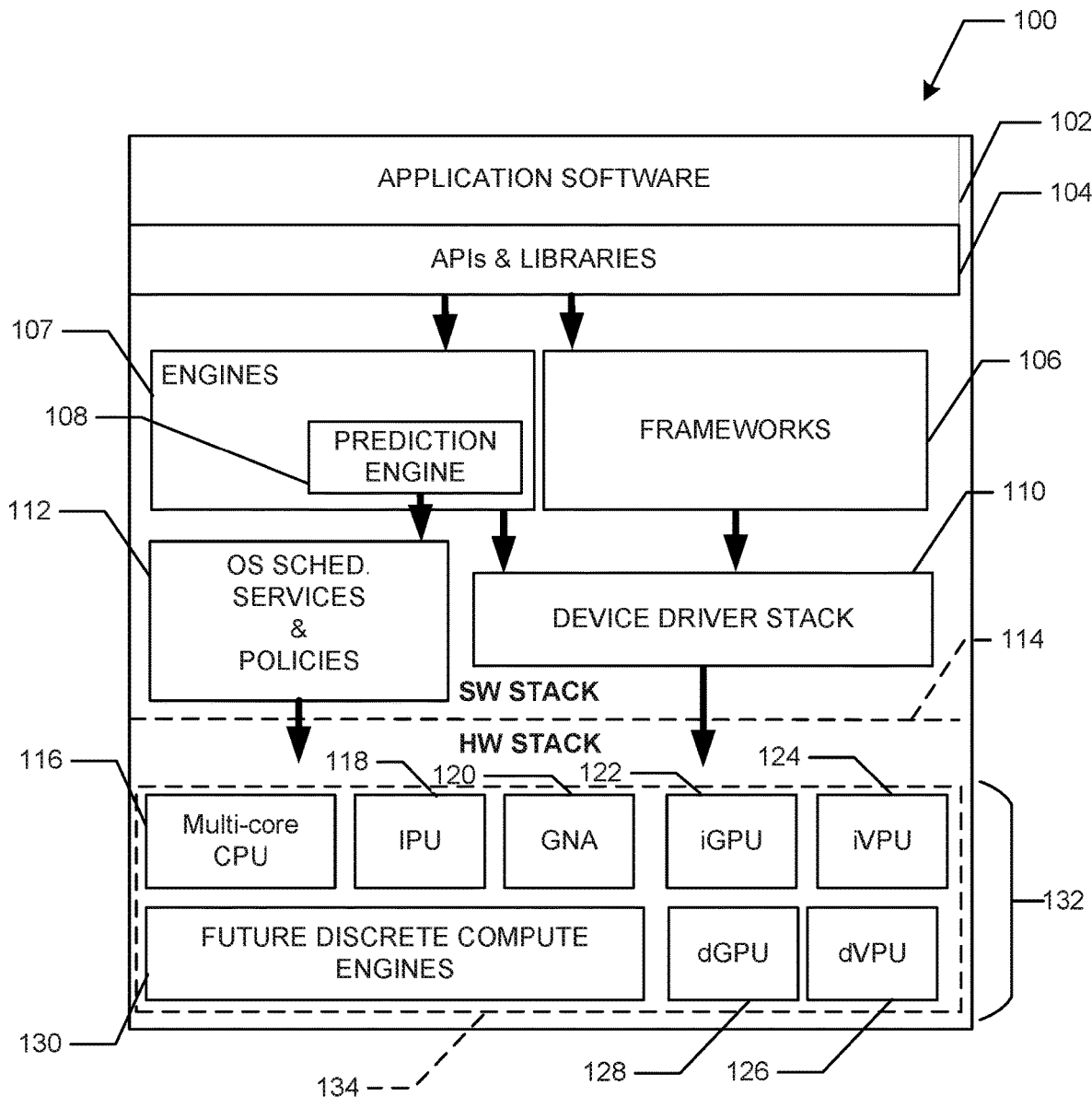
FIG. 1 is a block diagram of a computer operating system that includes an operating system (OS) scheduler, a prediction engine, and a set of compute blocks.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

The workload schedulers of today's computer operating systems (OS) assign workloads to compute resources based on policies. Such policies are often based on 1) an availability of a compute resource, 2) a priority of a workload to be performed, and/or 3) a performance demand associated with a workload (e.g., some workloads may require a compute integrated processor (IP) block that operates at a minimum speed, etc.). However, today's OS scheduler policies do not take thermal and energy efficient usage of a compute IP block into consideration when assigning workloads. For example, prior OS schedulers do not take into account a manner in which heat is distributed across compute IP blocks and sometimes within individual compute IP blocks. Instead, such prior schedulers use policies that are based on utilization and/or pre-defined performance and power efficiency differences. Further, the policies used by prior OS schedulers seek to attain turbo performance (e.g., speed), whereas the methods and apparatus disclosed herein focus on allowing longer operational periods at higher frequencies by utilizing compute IP blocks that are at lower temperatures and/or which will take longer to reach their maximum temperature based on their location and proximity to other compute IP blocks.

Some prior OS schedulers are also designed to react to a first compute IP block reaching a temperature threshold by migrating threads from the temperature-elevated first compute IP block to a second compute IP block. However, the second compute IP block (to which the threads are migrated)

is not chosen based on a temperature of the second compute IP block or a temperature pattern across multiple compute IP blocks. Further, the migration of the threads by prior OS schedulers can result in a performance penalty. In contrast, example schedulers disclosed herein focus on reducing performance loss by using policies that take temperature into consideration when assigning workloads. Taking temperature into consideration, allows a compute system to avoid (or reduce) the need to migrate threads, to avoid overheating (especially in fan-less systems), and/or to limit (and sometimes eliminate) any need to perform thermal throttling.

FIG. 1 is a block diagram of a computer system 100 having multiple compute IP blocks. In some examples, the computer system 100 includes example application software 102, example application interfaces (APIs) and software libraries 104, example frameworks 106 (e.g., artificial intelligence frameworks such as WinML, CrosML, OpenVino, etc.), example engines 107 to execute the software (e.g., an example prediction engine 108, audio engines, video engines, gaming engines, etc.), and an example device driver stack 110. In some examples, the device driver stack 110 operates based on information supplied by the engines 107 including the prediction engine 108, the frameworks 106, and an example operating system scheduler 112 that executes based on/according to operating system (OS) services and operating system (OS) policies. As illustrated in FIG. 1, the aforementioned aspects of FIG. 1 communicate via a software stack (the components above the dotted line 114) with a hardware stack (the components below the dotted line 114). In some examples, example hardware of the computer system 100 includes an example multi-core computer processing unit 116, an example intelligence processing unit (IPU) 118, an example gaussian network accelerator (GNA) 120, an example integrated graphics processing unit (iGPU) 122, an example integrated video processing unit (iVPU) 124, an example discrete video processing unit (dVPU) 126, an example discrete graphics processing unit (dGPU) 128, and any discrete compute engines 130 that may be realized in the future. The hardware of FIG. 1, shown below the dotted line 114 (e.g., an example multi-core computer processing unit 116, an example IPU 118, an example GNA 120, an example iGPU 122, an example iVPU 124, an example dVPU 126, an example dGPUs 128, and example discrete compute engines 130 that may be realized in the future), are collectively referred to herein as compute IP blocks 132. The IP blocks 132 are disposed on an example silicon die 134 in FIG. 1, though the IP blocks 132 can also be disposed on individual silicon dies or several of the IP blocks 132 can be installed on one silicon die and others can be installed on a different silicon die, or any combination thereof.

In some examples, the example application software 102 executing or executable on the example computer system 100 operates in conjunction with one or more APIs and libraries 104 to communicate with one or more of the compute engines 107 and/or the frameworks 106 of FIG. 1. The example device driver stack 110 stores information received from the engines 107 and/or frameworks 106 in a stack to be executed in an order based on any operating rules used to govern the operation of the device driver stack 110. The OS scheduler 112 uses OS services and OS policies to schedule or select one or more of the hardware engines (e.g., the compute IP blocks 132) to which one or more workloads are to be assigned. The workloads constitute one or more of the software tasks operating on the engines 107 and/or the frameworks 106. In some examples, the OS scheduler 112 uses one of the compute IP blocks 132 recommended by the example prediction engine 108.

Figure 2:
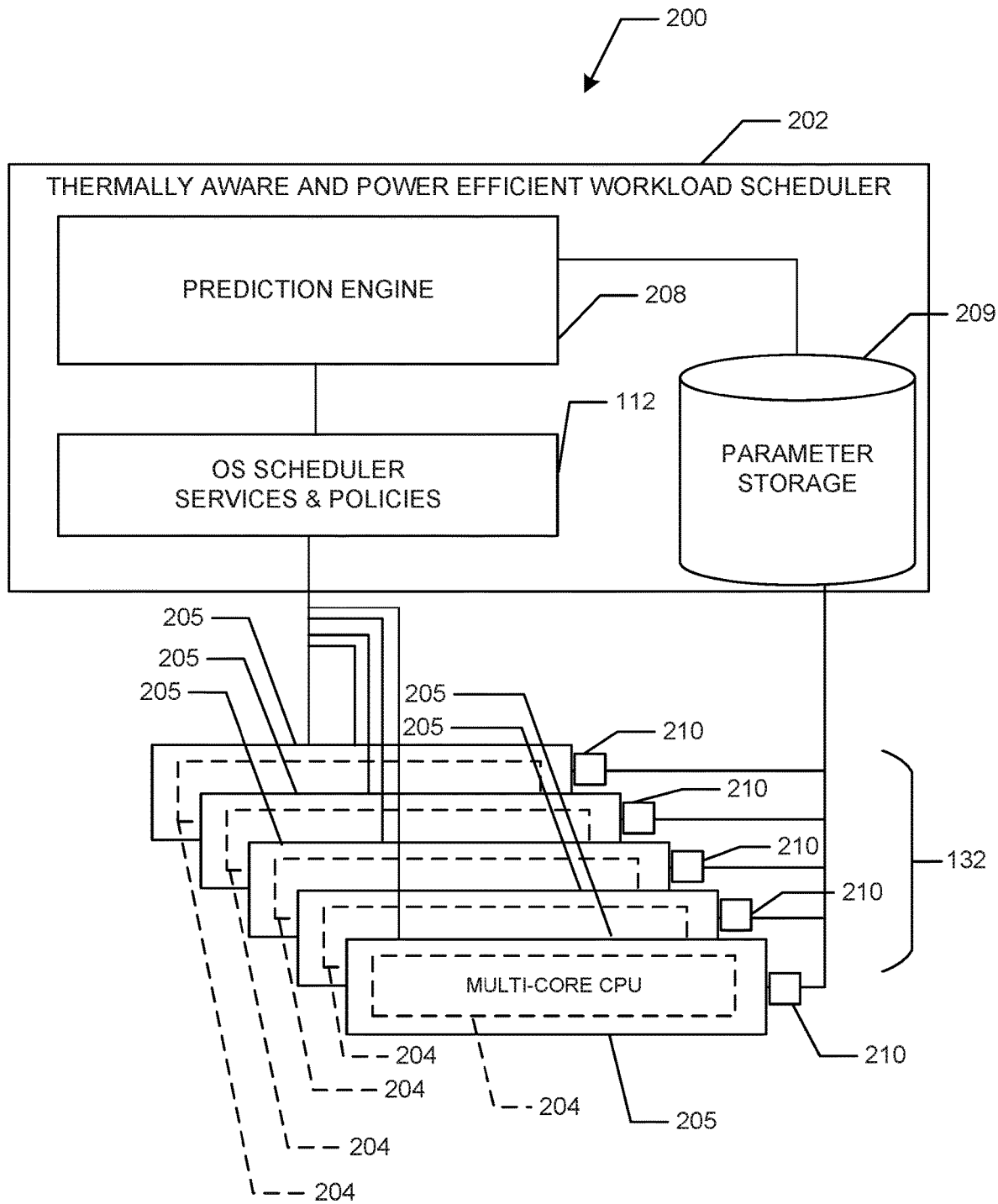
FIG. 2 is a block diagram of a thermally aware and power efficient workload scheduler that can be used to implement the OS scheduler, and the prediction engine of FIG. 1.

FIG. 2 is a block diagram of an example system 200 having an example thermally aware and power efficient (TAPE) workload scheduler 202 that includes the example OS scheduler 112 (also shown in FIG. 1). The TAPE workload scheduler 202 operates to improve the scheduling of workloads to one or more of the example compute IP blocks 132 (also shown in FIG. 1). In the example system of FIG. 2, the compute IP blocks 132 are represented as multi-core CPU's. 204. As used herein, references to the multi-core CPUs 204 includes reference to the individual cores of the multi-core CPUs 204. In some examples the TAPE workload scheduler 202 can replace (or collaborate with) the OS scheduler 112 of FIG. 1. In some examples, the OS scheduler 112 uses OS policies and OS services to govern assignment of workloads to the multi core CPUs. In some examples, the TAPE workload scheduler system 202 further includes an example prediction engine 208 (also shown as the prediction engine 108 of FIG. 1) that predicts temperatures, and/or operating powers of the multi-core CPUs 204. In some examples, the prediction engine 208 uses parameters such as temperature parameters of the cores of the multi-core CPUs 204, and/or temperature parameters of example silicon dies 205 on which the multi-core CPUs 204 are disposed, operating frequencies of one or more of the multi core CPUs 204, multi-core CPU 204 utilization values, etc. In some examples, the parameters are stored in an example parameter storage 209. In some examples, the parameter values (e.g., the temperature, the utilization values, etc.) can be supplied from the multi-core CPUs 204 to the parameter storage 209 by example data sensors/collectors 210 positioned to collect such parameter information from the compute IP blocks 132. In some examples, the prediction engine 208 predicts which of the multi-core CPUs 204 (and/or which of the cores of the multi-core CPUs 204) will operate at a lower temperature when assigned a workload (as compared to others of the cores/multi-core CPUs 204).

In some examples, the example prediction engine 208 can employ both a utilization rate and a temperature at which individual cores of the multi-core CPUs 204 are operating to determine a power of the individual cores of the multi-core CPUs 204. The example prediction engine 208 can use any appropriate method to calculate the operating powers of the example individual cores based on temperature and utilization rate. The calculated operating powers of the individual cores of the multi-core CPUs 204 can be updated as the cores of the multi-core CPU 204 continue to execute workloads thereby providing an indication of how the operating powers of the individual cores are changing in conjunction with the changes in temperature and changes in utilization rates. In some examples, the prediction engine 208 uses the operating power values, temperatures and utilization rates to determine which of the cores of the multi-core CPUs 204 are potentially close to throttling due to elevated operating temperatures.

In some examples, when the example prediction engine 208 is alerted by the example OS scheduler 112 that a workload is to be assigned, the prediction engine 208 can recommend one of the cores (of multi-core CPUs 204) that, if selected to execute the workload, will result in improved operating temperatures of the multi-core CPU 204 and will thereby result in less power leakage and, thus, improved power efficiency. The OS scheduler 112 may then take the recommendation of the prediction engine 208 into consideration when selecting a core of the multi-core CPU 204 to which the workload will be assigned.

Figure 3:
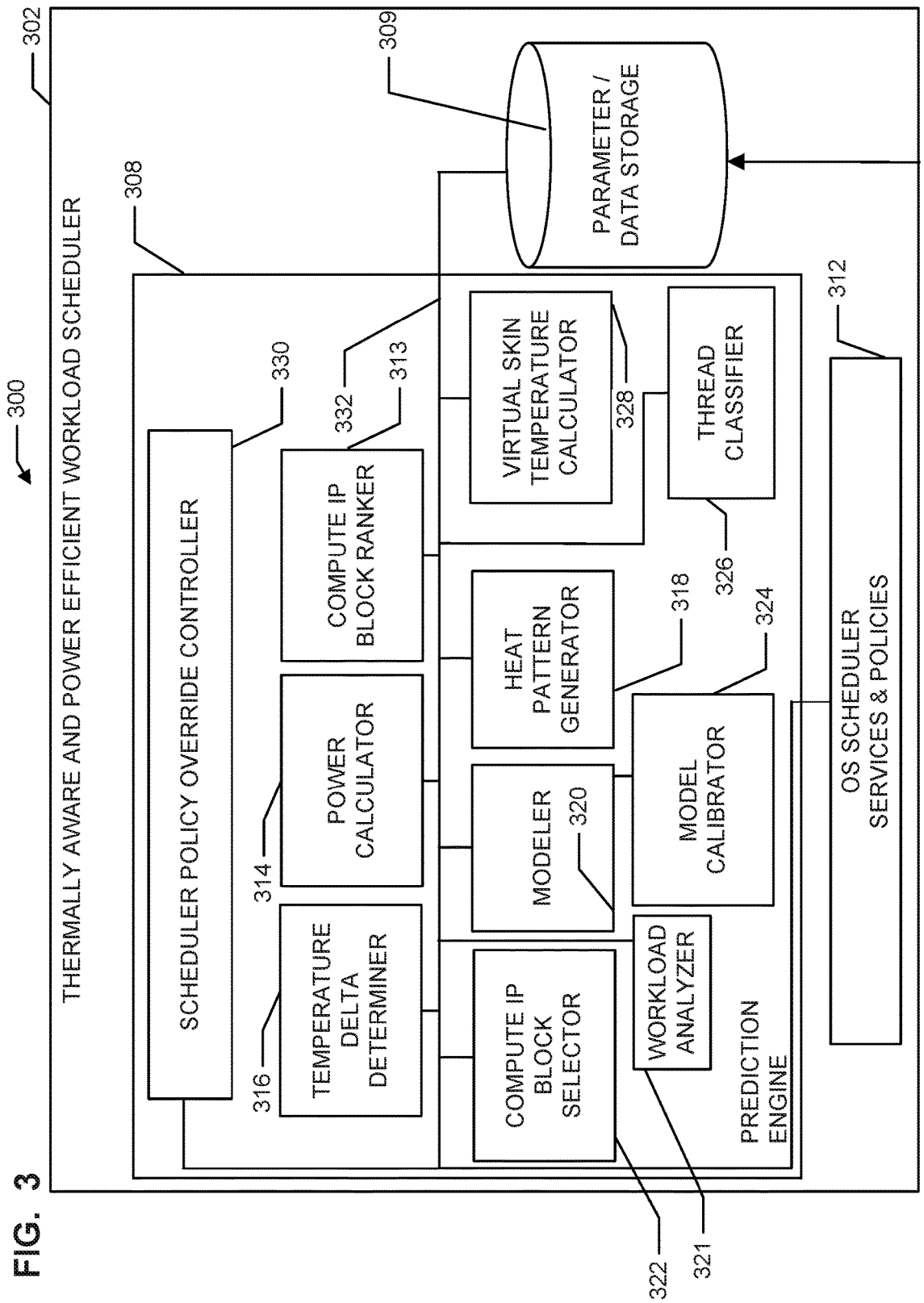
FIG. 3 is a block diagram of an example implementation of the thermally aware and power efficient workload scheduler of FIG. 2.

FIG. 3 is a block diagram of an example TAPE workload scheduler 302, which can be used to implement the TAPE workload scheduler 202 of FIG. 2. In some examples, the TAPE workload scheduler system 302 includes an example prediction engine 308 (also shown as the example prediction engine 208 of FIG. 2) and further includes an example parameter storage 309. The example prediction engine 308 can be used to implement the example prediction engine 108 of FIG. 1 and/or the example prediction engine 208 of FIG. 2). Similarly, the example parameter storage 309 can be used to implement the example parameter storage 209 of FIG. 2.

In some examples, the TAPE workload scheduler 302 includes an example OS scheduler 312 (that operates in accordance with prescribed OS services and OS policies) (also shown as the OS scheduler 112 in FIG. 1, and the OS scheduler 212 of FIG. 2) and operates to improve the scheduling of workloads to the example compute IP blocks 132 of FIG. 1 (and/or the multi core CPUs 204 of FIG. 2). Conventionally, such OS policies and OS services used by a conventional OS scheduler are designed to schedule workloads to one or more compute IP blocks 132 based on improving performance levels of the compute IP blocks 132. In some examples, the TAPE workload scheduler 202 instead (or also) uses policies that take compute IP block 132 (see FIG. 1) temperatures, and/or silicon die 205 (see FIG. 2) temperatures into consideration when assigning workloads. Taking such temperatures into consideration can reduce (or even eliminate) any adverse operating performance caused by increased compute IP block 132 (or silicon die 205) operating temperatures that may result from assigning an additional workload to such compute IP block 132.

In FIG. 3, the example prediction engine 308 includes an example compute IP block ranker 313, an example power calculator 314, an example temperature delta determiner 316, an example heat pattern generator 318, an example modeler 320, an example workload analyzer 321, an example compute IP block selector 322, an example model calibrator 324, an example thread classifier 326, an example virtual skin temperature calculator 328, and an example scheduler policy override controller 330, all of which communicate via an example bus 332 (or other communication interface). The example compute IP block selector 322 of the example prediction engine 308 operates to select one or more of the several example compute IP blocks 132 (see FIG. 1) to which a workload is to be assigned based on information generated at one or more of the compute IP block ranker 313, the power calculator 314, the temperature delta determiner 316, the heat pattern generator 318, the modeler 320, the workload analyzer 132, the compute IP block selector 322, the example model calibrator 324, the example thread classifier 326 and/or the example virtual skin temperature calculator 328.

In some examples, the example parameter storage 309 stores parameters collected from the example compute IP blocks 132 as well as one or more silicon die(s) 134 (FIG. 1) on which the compute IP blocks 132 (FIG. 1) are disposed. In some examples, the parameters can include one or more sensed temperatures/sensed operating frequencies of the compute IP blocks 132, one or more utilization rates of the compute IP blocks 132, virtual skin temperatures of the compute IP blocks 132 and/or the silicon die(s) 134, a heat pattern, system/compute IP block thermal budget information, manufacturer supplied thermal characteristics, etc. The thermal budget information for a compute/IP block (e.g., the compute IP blocks 132) can be manufacturer supplied and indicate a thermal budget that, if exceeded, will result in degraded performance of the compute IP block.

In some examples, the example OS scheduler 112 becomes aware of a workload to be assigned. In some examples, the OS scheduler 112 may be supplied such information via any appropriate technique. The OS scheduler 112 supplies (using any method) information identifying the workload as well as information about the workload to the example workload analyzer 321 of the example prediction engine 308. The workload analyzer 321 can analyze the workload to identify/determine information about the workload including, for example, a size (or estimated) size of the workload, a time in which the workload is expected to be executed, a type of the workload (e.g., whether the workload is to be executed on a particular type of one of the compute IP blocks 132), etc. In some examples, any or all of such information can be made available to any of the components of the prediction engine 308. In some examples, one or more of the components of the prediction engine 308 begin operating based on such information. In some examples, various ones of the components of the prediction engine 308 operate to track, for example, temperatures or powers of the compute IP blocks 132 in anticipation of a future workload to be assigned. In some examples, the components of the prediction engine 308 generally operate in the manner described below, except that one or more of the components may operate in a modified manner as needs arise.

In some examples, the example virtual skin temperature calculator 328 determines/predicts a virtual skin temperature based on measurements supplied by a motherboard temperature sensor and other variables. In some examples, the virtual skin temperature is calculated using a first equation [Eqn. 1], or a second equation [Eqn. 2], both provided below.

$$\text{Virtual skin temperature sensor} = 0.95 * (\text{motherboard sensor temperature} - 25° \text{ C.}) + \text{average core frequency}/285.7 \text{ GHz}/° \text{ C.} \quad [\text{Eqn. 1}]$$

$$\text{Virtual skin temperature sensor} = 0.95 * \text{motherboard sensor temperature} - 25° \text{ C.}) + 0.127 * (\text{Average Core Temperature} - 25° \text{ C.}). \quad [\text{Eqn. 2}]$$

In some such examples, when Eqn. 1 is used to predict the virtual skin temperature, and one (or more) of the sensor temperatures on motherboard reads 65° C. and the average core frequency is 2000 GHz, the virtual skin temperature can be predicted using Eqn. 1 as 45° C.

The parameters stored in the example parameter storage 309 can be collected from an array of sensors 210 coupled to the compute IP blocks 132 as well as various locations on or adjacent to the silicon die(s) 134 (FIG. 2).

In some examples, the example power calculator 314 calculates power values for the compute IP blocks 132 based on a corresponding temperature value and a corresponding utilization value. The power calculator 314 may also continue to update the power values to account for changes in the temperature values and utilization values stored in the example parameter storage 309 due to on-going operation of the system 300. A power value of any of the compute IP blocks 132 that is/are rising due to an elevated operating temperature can indicate that power leakage is occurring such that the power efficiency of such compute IP blocks 132 is decreasing and that the compute IP block may soon throttle. In some examples, the elevated temperature of any of the one or more compute IP blocks 132 is a result of over utilization of the one or more compute IP blocks 132.

In some examples, the example temperature delta determiner 316 will determine/predict how a temperature of one or more of the example compute IP blocks 132 will change if a candidate workload was to be assigned to the one or more of the compute IP blocks 132. In some examples, the example temperature delta determiner 316 receives information about the candidate workload from the example OS scheduler 312 and receives temperature information from the example parameter storage 309 and/or power values from the example power calculator 314. In some examples, the parameters for calculating power as a function of utilization and temperature as well as the physical location/geometries of the compute IP blocks 132 are supplied to the temperature delta determiner 316. In some examples, the same information can be supplied to the power calculator 314 for use in computing operating powers of the one or more compute IP blocks 132. The power calculator 314 can supply the operating powers to the temperature delta determiner 316 for use in predicting a delta (e.g. change in) temperature for each of the compute IP blocks 132. In some examples, the heat pattern generator 318 uses the same or similar information as the power calculator 314 and/or the temperature delta determiner 316 to generate a heat pattern that illustrates an effect that assigning a workload to a particular compute IP block 132 will have on adjacent compute or nearby compute IP blocks 132 and/or regions of the silicon die 134. In some examples, the predicted delta temperatures of the compute IP blocks 132 and/or the silicon die 134 can then be supplied to the compute IP block selector 322 to select one (or more) of the compute IP blocks 132 for recommendation to the OS scheduler 312.

In some examples, the example IP block selector 322 selects one of the compute IP blocks 132 based on which of the compute IP blocks 132 has a thermal profile that will be least affected by the assignment of the workload. The compute IP block selector 322 supplies information identifying the selected one of the example compute IP blocks 132 for recommendation to the example OS scheduler 312. The OS scheduler 312 can choose to assign the workload to the recommended one of the compute IP blocks 132. In some examples, the example scheduler policy override controller 330 will force the OS scheduler 312 to override any other policies that would cause the OS scheduler 312 to choose a compute IP block 132 other than the recommended one of the compute blocks 132. Thus, when the scheduler policy override controller 330 is in effect, OS scheduler 312 automatically choses the recommended one of the compute blocks 132 to perform the workload.

In some examples, the example power calculator 314 supplies calculated power values to the example modeler 320. The modeler 320 is designed to model a thermal flow occurring on the silicon die 134 (see FIG. 1) due to the operation of the example compute IP blocks 132, the positions of the compute IP blocks 132 on the silicon die 134 (e.g., the geometry of the silicon die, etc.) and the positions of other components on the silicon die 134. In some examples, the modeler 320 models the thermal flow by executing a compact transient thermal (CTT) model. The compact transient thermal model can reflect/predict the flow of thermal energy through the silicon die and the components thereon as the flow changes over time. Further, the thermal flow information can be supplied to the example temperature delta determiner 316 to predict changes in temperatures of the compute IP block 132 and/or portions of the silicon die 134.

In some examples, the CTT model executed by the example modeler 320 is initially calibrated by the example model calibrator 324. The example model calibrator 324 provides initial data to populate input requirements needed by the modeler 320 to begin execution. In some examples, the model calibrator 324 uses the parameters stored in the parameter storage 309 as well as the power values supplied by the power calculator 314 to perform an initial calibration of the modeler 320. In some examples, the model calibrator 324 performs the calibration using a system computational fluid dynamics (SCFD) model with silicon integrated processor (IP) block and power-distribution maps. The IP block is a block on a die used for a particular purpose (e.g., a CPU, a GPU, etc.). In some examples, power distribution maps are used to create the CTTM model (which can be an SCFC model) which is thereafter supplied to the model calibrator 324. For example, the SCFC model can include equations that are calibrated from the power distribution maps. By using the power distribution maps to calibrate the model, the resulting model can account for the power density in the die to thereby generate an accurate junction temperature. For example, where a uniform core model can identify a junction temperature as being 90°, a model correlated using a power distribution map can yield a more accurate junction temperature of 100° C. by accounting for the power density. The model calibrator 324 includes the power density at different locations on the die as well as its dimensions, package thermal properties and boundary conditions when creating a calibrated model. The resulting data generated by the model represent the hotspots of each integrated processor (IP) block.

The model calibrator 324 also operates to continuously update the information used to calibrate the CTT model to account for changes in the temperature of the silicon die 134 as reflected in the changes to the parameters. In some examples, the continuous (real-time) update of the model calibrator (e.g., CTT model which may be implemented using the SCFD model, etc.) allows the temperature delta determiner 307 to account for characteristics of the components (e.g., compute IP blocks 132) that are not necessarily reflected in manufacturer supplied characteristics such as component-to-component (e.g., compute IP block to compute IP block) variability and to account for thermal interface resistance non-uniformities as well as system drift.

In some examples, the example modeler 320 supplies information generated using the CTT model to the example heat pattern generator 318. The heat pattern generator 318 uses the modeler-supplied information to generate the heat patterns that illustrate the temperature of the example silicon die 134 at various locations on and/or regions of the silicon die 134. In some examples, as described above, the modeler 320 also supplies information generated by the CTT modeler 320 to the temperature delta determiner 316. In some examples, the example compute IP block ranker 313 uses any information contained in the heat patterns, the parameter storage 309, and/or any information generated by the example power calculator 314, the example temperature delta determiner 316, the example virtual skin temperature calculator, the example modeler 320, the example model calibrator 324, and/or the example heat pattern generator 318 to determine a power efficiency and/or a current temperature of the compute IP blocks 132 disposed on the silicon die 134.

In some examples, the example compute IP block ranker 313 uses the information to rank the compute IP blocks 132 based on their pre-defined performance, their calculated power efficiency and/or the predicted temperature values (including temperatures of areas/regions of the silicon die 134 adjacent to (or near) areas/regions on which the compute IP blocks 132 are disposed). Thus, the compute IP block ranker 313 is capable of ranking compute IP blocks 132 both individually as well as across multiple compute IP blocks 132. In some examples, the compute IP block ranker 313 favors utilization of cores (compute IP blocks 132) with lowest local temperature and, therefore, a lowest amount of power leakage. In some examples, the compute IP block ranker 313 additionally sorts the compute IP blocks 132 from a most efficient/coolest compute IP block 132 to a least efficient/coolest compute IP blocks 132. In some examples, the example modeler 320, the example model calibrator 324, and the example heat pattern generator 318 are implemented as at least a portion of the example temperature delta determiner 316.

In some examples, a workload includes a thread. Some threads can be distinguished into a first class of threads that use higher (1) Dynamic Capacitance firmware flash utility (Cdyn FFU), (2) streaming single instruction, multiple data (SIMD) extension (3) advanced vector extension (AVX), vector neural network instruction (VNNI), etc., and heat up a compute IP block more quickly than other threads. As a result, such threads require more temperature headroom. A second class of threads use lower Cdyn FFUs—memory bound phases, etc. such that this second class of threads do not contribute to temperature increases/bumps as much as the first class of threads. As a result, the second class threads are less likely than the first class threads to require migration. In some such examples, the compute IP block ranker 313 is configured to consider the threads (and the class of such threads) included in a workload when ranking such a workload. In some examples, an example thread classifier 326 classifies the threads of a workload as belonging to the first class or the second class by profiling the threads at runtime using performance counters or P-code telemetry (ICCP license level, top down metrics memory boundedness). In some examples, the compute IP block ranker 313 uses the thread classification to identify the threads that will likely need to be migrated due to their need for additional temperature overhead.

The example compute IP block ranker 313 can supply the ranking information to the example OS scheduler 312 (FIG. 1) for use in assigning workloads to individual ones of the example compute IP blocks 132 on an on-going basis or based on requests from the OS scheduler 312. In some examples, the compute IP block ranker 313 supplies the ranking to the compute IP block selector 322 which can use the information to select one or more compute IP blocks 132 to be recommended to the OS scheduler 312 for use in executing the workload.

In some examples, the OS scheduler 312 schedules workloads that require two (or more) compute IP blocks 132 (e.g., an integrated GT (an IP block that resides on the same die as the core and that is used to process graphics) and a CPU core). In some such examples, the compute IP block selector 322 may use the heat patterns generated by the heat pattern generator or any other of the available information (stored in the parameter storage 309, etc.) to select a CPU core that is farthest from the GT and thereby less likely to be affected by heat generated by the GT. A GT is an IP block for processing graphics and that is located on the same die as the cores.

Figure 4:
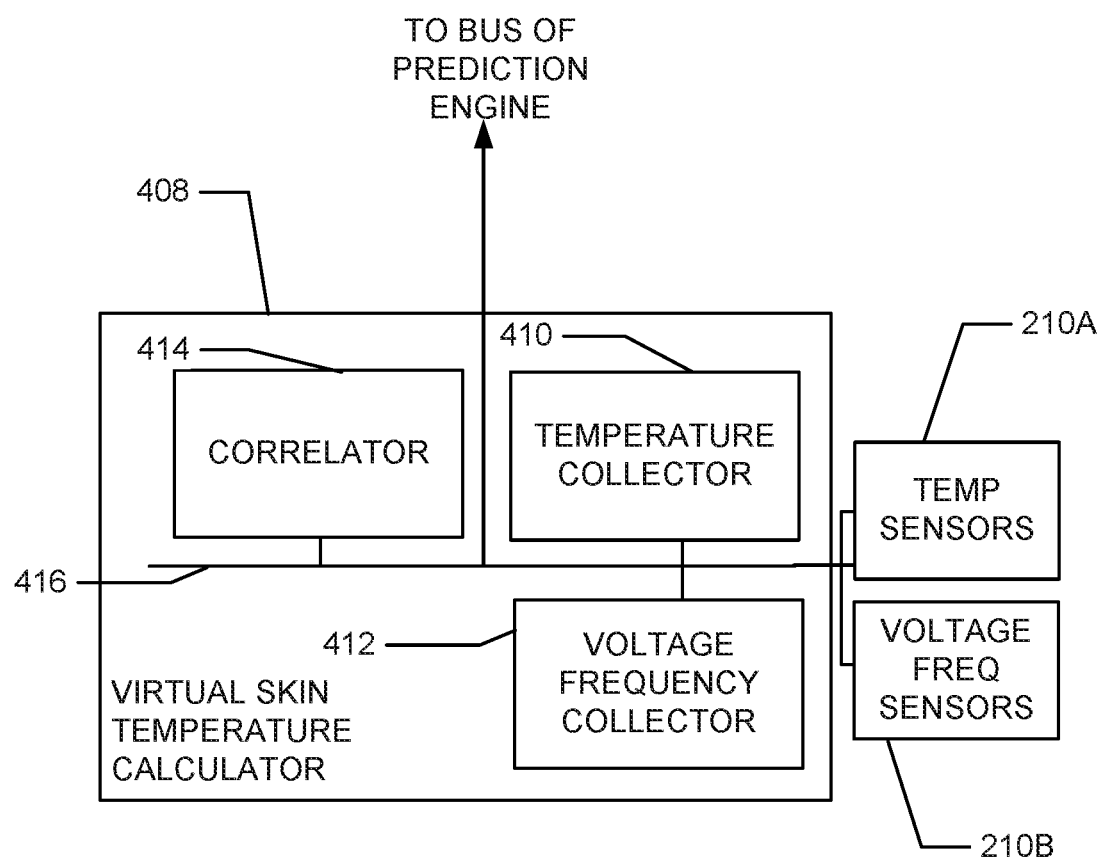
FIG. 4 is a block diagram of an example virtual skin temperature calculator included in the thermally aware and power efficient scheduler of FIG. 2 and/or FIG. 3.

FIG. 4 is a block diagram 400 of an example virtual skin temperature calculator 408 that can implement the example virtual skin temperature calculator 328 (of FIG. 3). In some examples, the virtual skin temperature calculator 408 includes an example temperature collector 410, an example voltage frequency collector 412, and an example correlator 414. In some examples, the correlator 414 correlates the temperatures collected by the temperature collector 410 from the temperature sensors 210A with the frequencies collected by the voltage frequency sensors 210B, to determine one or more virtual skin temperatures as described above. In some examples, the components of the virtual skin temperature calculator 408 communicate via a bus 416.

Figure 5:
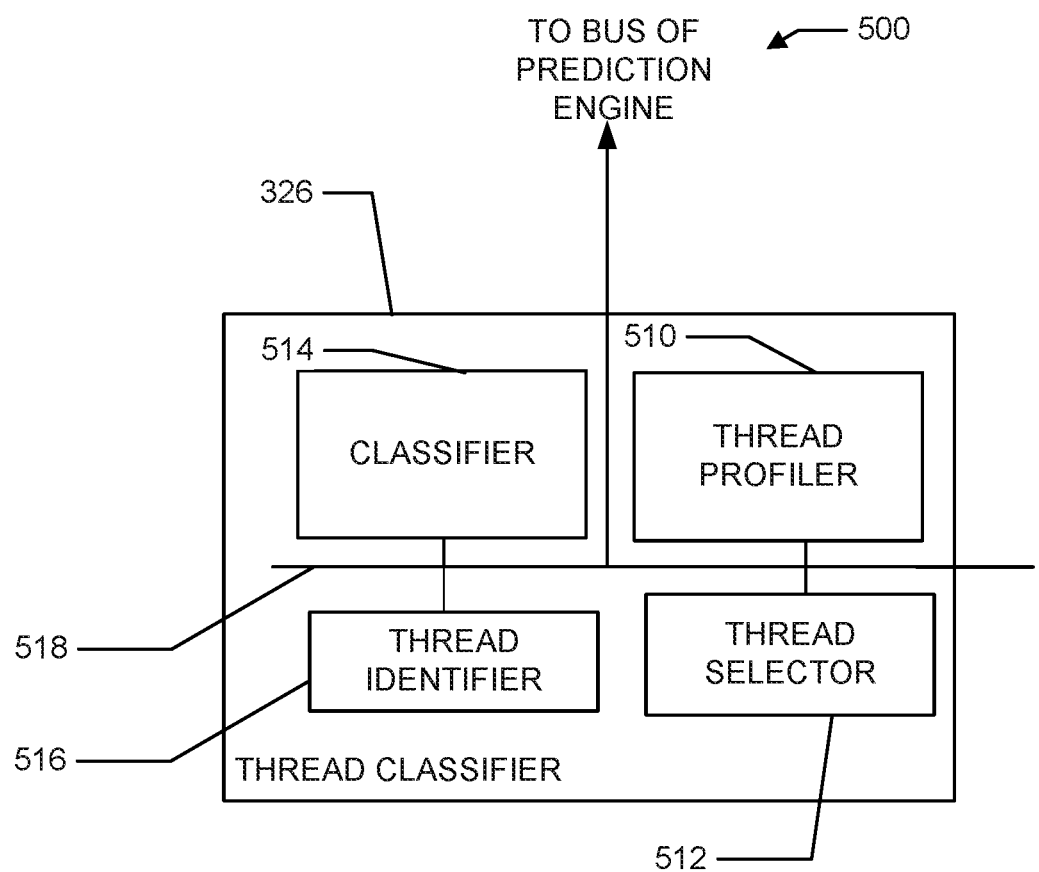
FIG. 5 is a block diagram of an example thread classifier included in the thermally aware and power efficient scheduler of FIG. 2 and/or FIG. 3.

FIG. 5 is a block diagram 500 of the example thread classifier 326 (of FIG. 3). In some examples, the thread classifier includes an example thread profiler 510, an example thread selector 512, an example classifier 514, and an example thread identifier 516, all coupled via an example bus 518. In some examples, the thread identifier 516 identifies threads that are currently executing on one or more of the compute IP blocks 132 (see FIG. 1). The example thread profiler 510 profiles the operation of one of the compute IP blocks 132 on which the identified thread is operating during runtime. In some examples, the thread profiler 510 may monitor a compiler of the one of the compute IP blocks 132 on which the identified thread is operating. The thread profiler 510 may obtain information such as an operating temperature, an operating power, an example number of memory accesses executed by the thread, etc., of the compiler/compute IP block 132 on which the thread is executing during runtime of the thread (or threads). The thread profiler 510 supplies such profile information to the classifier 514 which classifies the thread based on the profile information. In some examples, the threads are classified as requiring more temperature headroom or the threads are classified as requiring less temperature headroom. The classifier 514 supplies the classification and corresponding thread information to the thread selector 512. The example thread selector 512 selects one or more of the threads for migration to a different one of the compute IP blocks 132 based on the thread classification. In some examples, the example thread identifier 516 provides information identifying the one or more of the selected threads to the OS scheduler 312 (FIG. 3).

In some examples, the thread identifier 516 and/or the classifier 514 of the thread classifier 326 supplies the profile information and thread identifying information to one or more of the example temperature delta determiner 316, the example power calculator 314, the example compute IP block ranker 313, the example compute IP block selector 322, the example modeler 320, the example model calibrator 324, the example heat pattern generator 318, the example virtual skin temperature generator 328, etc. as information that can be used to determine a compute IP block ranking and/or a compute IP block to be selected. In some examples, a thread that is identified as required more temperature headroom is identified by the thread classifier 326 as one of the pieces of information to be taken into consideration when assigning a workload that will include executing the thread. In some examples, the thread is already operating on a compute IP block 132 when it is classified as a thread that requires more temperature headroom (as opposed to a thread that requires less temperature headroom). In some such examples, the thread classifier 326 can supply the headroom information to the example compute IP block ranker 313 and/or to the example compute IP block selector 322. Either of the compute IP block ranker 313 or the compute IP block selector 322 can use the information to determine that a workload including the thread is to be recommended for reassignment to a more suitable one of the compute IP blocks 132 (e.g., one of the compute IP blocks having sufficient temperature headroom to support the thread's temperature needs).

In some examples, the OS scheduler 312 can use the thread-identifying information to migrate the identified thread to another of the example compute IP blocks 132. In some examples, the thread identifier 516 also identifies the selected threads to the example compute IP block selector 322 which can respond by selecting one of the compute IP blocks 132 to which the thread can be migrated, based on the ranking performed by the compute IP block ranker 313. In some examples, the compute IP blocks 132 selected for the migration operation are the compute IP blocks 132 to which the thread(s) can be migrated with limited adverse effect or no adverse effect on the power leakage experienced by the compute IP blocks 132.

While an example manner of implementing the thermally aware and power efficient workload scheduler 202, 302 is illustrated in FIG. 2, FIG. 3, FIG. 4, and FIG. 5, one or more of the elements, processes and/or devices illustrated in FIG. 2, FIG. 3, FIG. 4, and/or FIG. 5 may be combined, divided, re-arranged, omitted, eliminated and/or implemented in any other way. Further, the example prediction engine 208, 308, the example parameter storage 209, 309, the example OS scheduler 112, 312, the example parameter storage 209, 309, the example sensors 210, 210A, 210B, the example compute IP block ranker 313, the example power calculator 314, the example temperature delta determines 316, the example heat pattern generator 318, the example modeler 320, the example compute IP block selector 322, the example model calibrator 324, the example thread classifier 326, the example virtual skin temperature calculator 328, 408, the scheduler policy override controller 330, the example temperature collector 410, the example voltage frequency collector 412, the example correlator 414, the example thread profiler 510, the example thread selector 512, the example classifier 514, the example thread identifier 516, and/or more generally the example thermally aware and power efficient workload scheduler 202, 302 of FIGS. 1, 2, 3, 4 and/or 5 may be implemented by hardware, software, firmware and/or any combination of hardware, software and/or firmware. Thus, for example, any of the example prediction engine 208, 308, the example parameter storage 209, 309, the example OS scheduler 112, 312, the example sensors 210, 210A, 210B, the example compute IP block ranker 313, the example power calculator 314, the example delta temperature determiner 316, the example heat pattern generator 318, the example modeler 320, the example compute IP block selector 322, the example model calibrator 324, the example thread classifier 326, the example virtual skin temperature calculator 328, 408, the scheduler policy override controller 330, the example temperature collector 410, the example voltage frequency collector 412, the example correlator 414, the example thread profiler 510, the example thread selector 512, the example classifier 514, the example thread identifier 516, and/or more generally the example thermally aware and power efficient workload scheduler 202, 302 of FIGS. 1, 2, 3, 4, and/or 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example prediction engine 208, 308, the example parameter storage 209, 309, the example OS scheduler services and policies 112, 312, the example parameter storage 209, 309, the example sensors 210, 210A, 210B, the example compute IP block ranker 313, the example power calculator 314, the example temperature delta determiner 316, the example heat pattern generator 318, the example modeler 320, the example compute IP block selector 322, the example model calibrator 324, the example thread classifier 326, the example virtual skin temperature calculator 328, 408, the scheduler policy override controller 330, the example temperature collector 410, the example voltage frequency collector 412, the example correlator 414, the example thread profiler 510, the example thread selector 512, the example classifier 514, the example thread identifier 516, is/are hereby expressly defined to include a non-transitory computer readable storage device or storage disk such as a memory, a Blu-ray disk, etc. including the software and/or firmware. Further still, the example thermally aware and power efficient workload scheduler 208, 208 of FIG. 2, and/or 3, respectively, may include one or more elements, processes and/or devices in addition to, or instead of, those illustrated in FIGS. 2, 3, 4, and/or 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
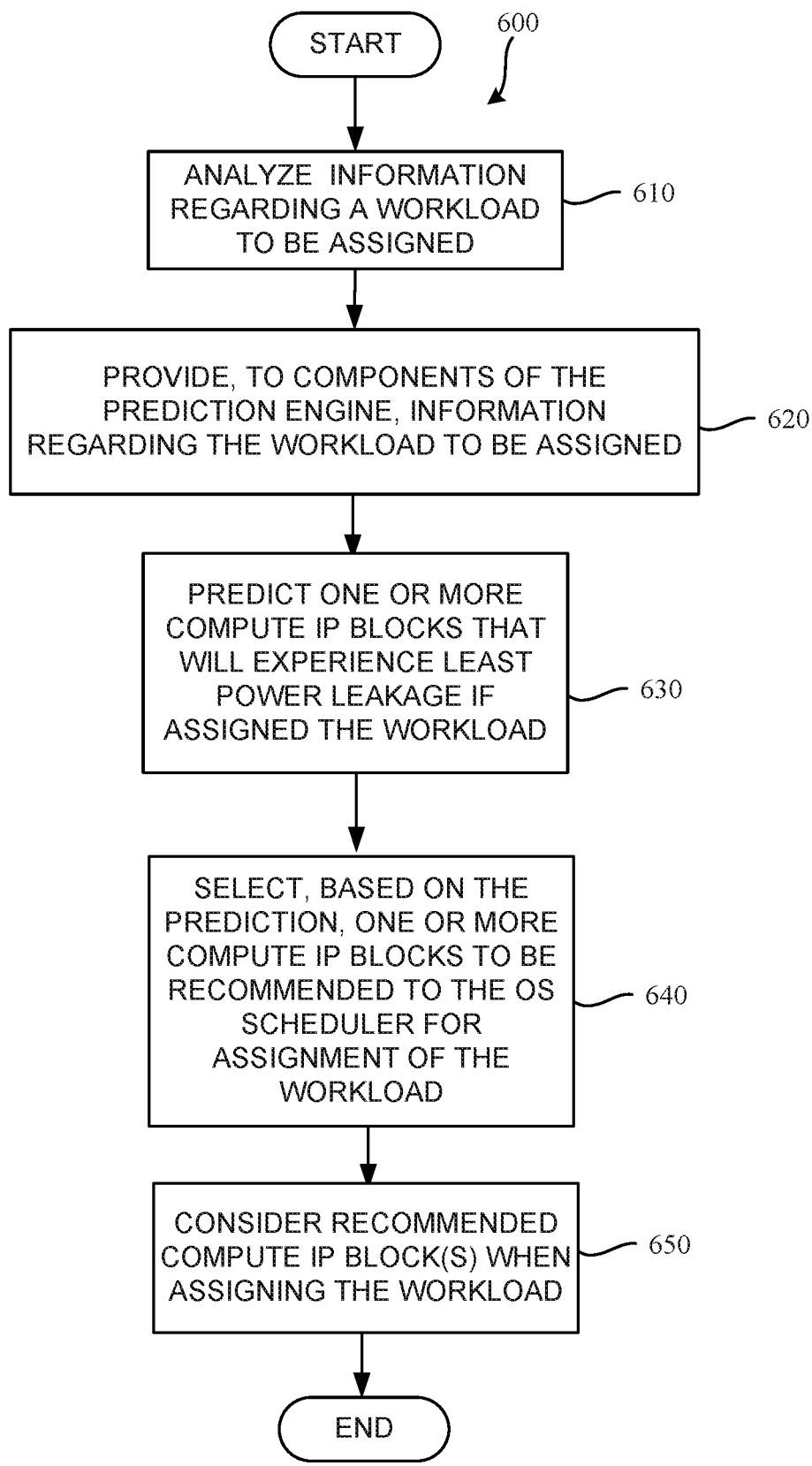
FIG. 6 is a flow chart representative of machine readable instructions which may be executed to implement the thermally aware and power efficient scheduler of FIG. 2 and/or FIG. 3.
Figure 7:
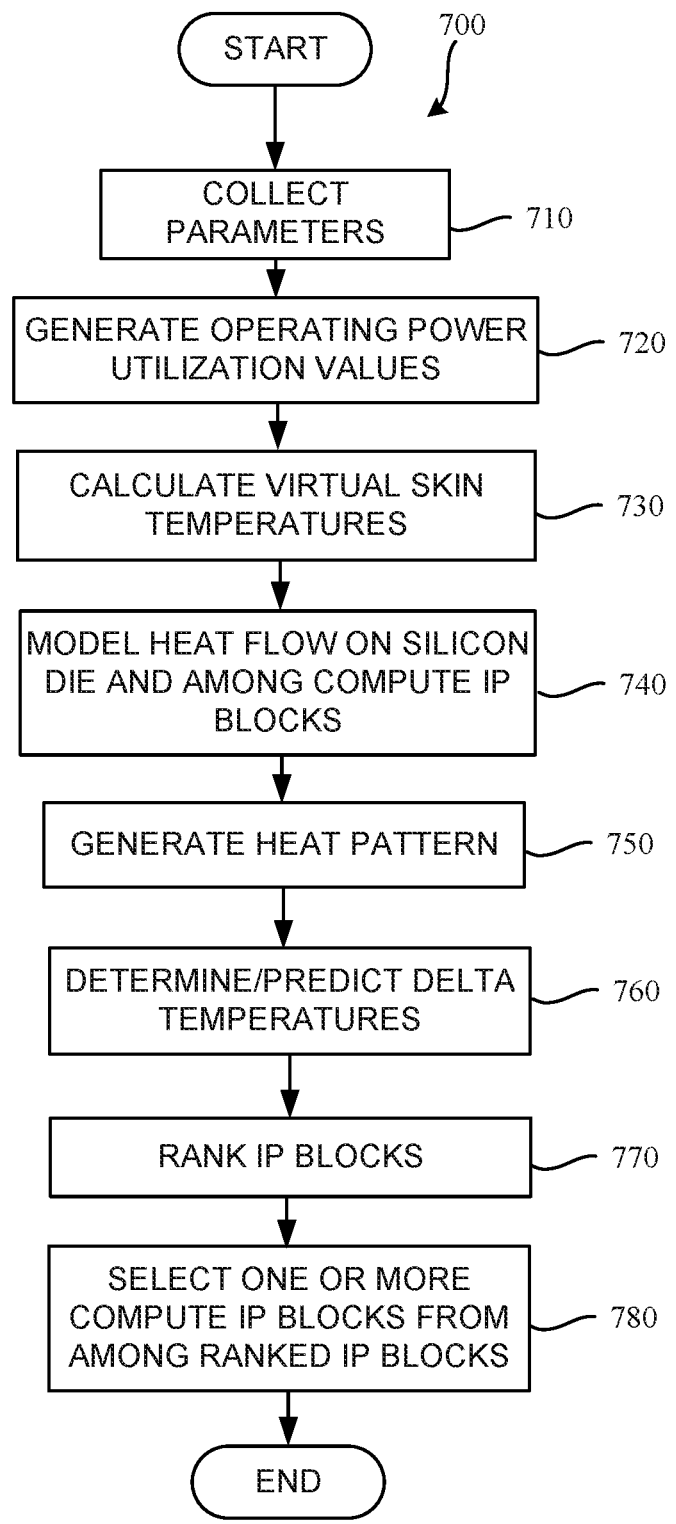
FIG. 7 is a flow chart representative of machine readable instructions which may be executed to implement the prediction engine of the thermally aware and power efficient scheduler of FIG. 2 and/or FIG. 3.
Figure 8:
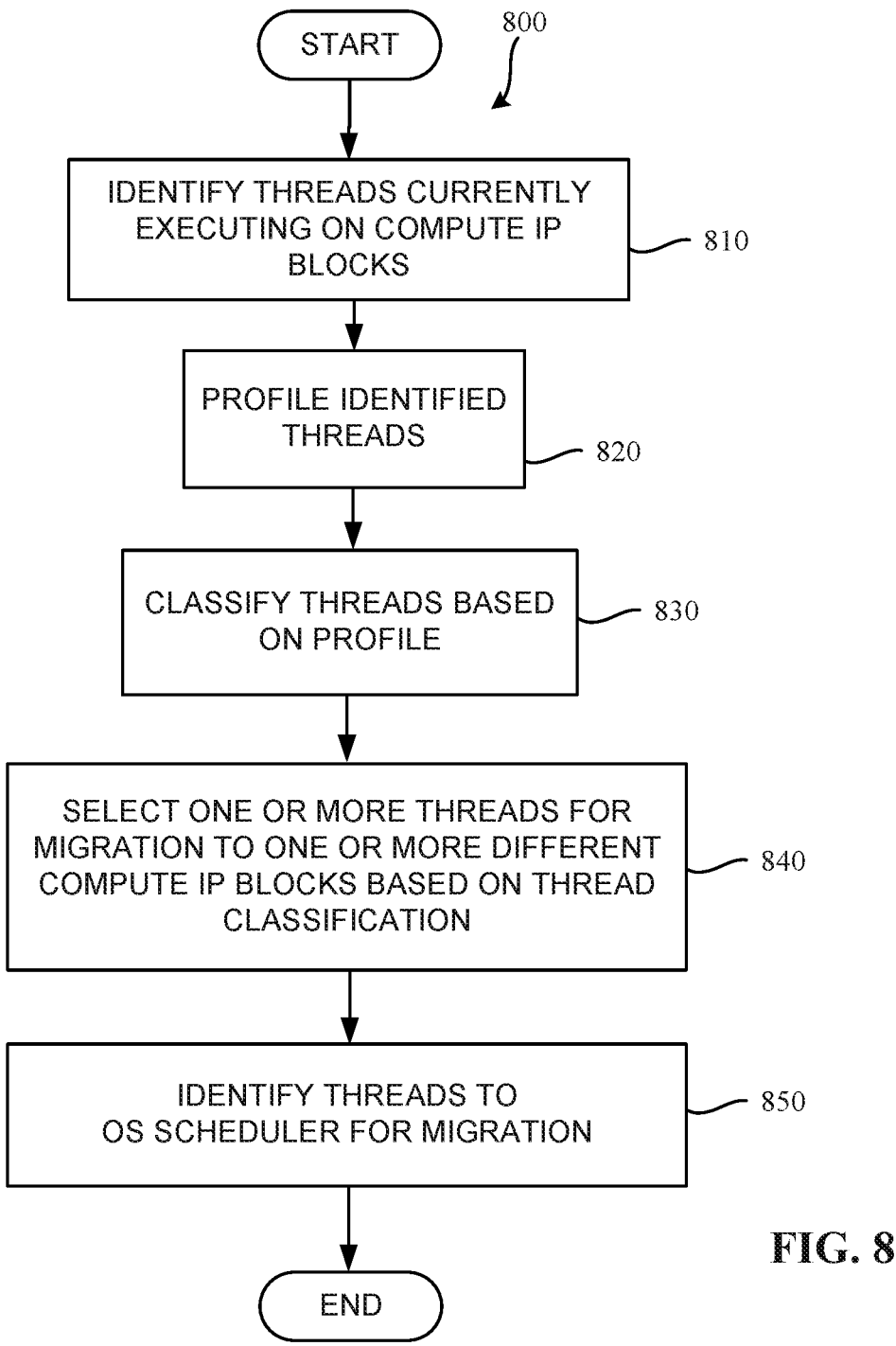
FIG. 8 is a flow chart representative of machine readable instructions which may be executed to implement the thread classifier of the prediction engine of FIG. 3.
Figure 9:
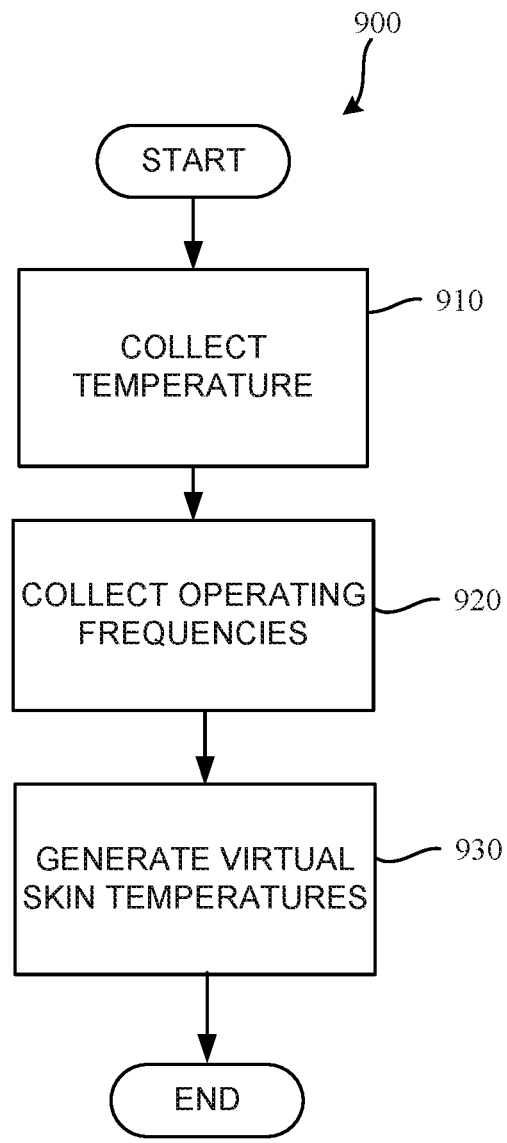
FIG. 9 is a flow chart representative of machine readable instructions which may be executed to implement the virtual skin temperature calculator of the prediction engine of FIG. 3.

Flowcharts representative of example hardware logic, machine readable instructions, hardware implemented state machines, and/or any combination thereof for implementing the example thermally aware and power efficient scheduler 202 of FIG. 2 are shown in FIGS. 6, 7, and 8. A flowchart representative of example hardware logic, machine readable instructions, hardware implemented state machines, and/or any combination thereof for implementing the example virtual skin calculator 408 of FIG. 4 are shown in FIG. 9. A flowchart representative of example hardware logic, machine readable instructions, hardware implemented state machines, and/or any combination thereof for implementing the example thread classifier 326 of FIG. 5 is shown in FIG. 8. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 6, and 7 many other methods of implementing the example thermally aware and power efficient scheduler 202, 302 may alternatively be used. Likewise, although an example program is described with reference to the flowchart illustrated in FIG. 8, many other methods of implementing the example thread classifier 326 of FIG. 5 may alternatively be used. Likewise, although an example program is described with reference to the flowchart illustrated in FIG. 9, many other methods of implementing the example virtual skin temperature calculator of FIG. 4 may alternatively be used. Likewise, although an example program is described with reference to the flowchart illustrated in FIG. 10, many other methods of implementing the example OS scheduler override controller 330 of FIG. 3 may alternatively be used.

For example, with respect to the flowcharts of FIGS. 6, 7, 8, 9, and 10, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7, 8, 9, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flow chart representative of machine readable instructions (also referred to as an example program 600) which may be executed to implement the thermally aware and power efficient scheduler of FIG. 2 and FIG. 3. The program 600 of FIG. 6 includes block 610 at which the example workload analyzer 321 (FIG. 3) analyzes information regarding a workload to be assigned as described above in connection with FIG. 3. The workload analyzer provides information regarding the workload that is to be assigned to one of more of the components of the prediction engine 308 (Block 620) in the manner described above with respect to FIG. 3. One or more of the example components of the prediction engine 308 collaborate and/or operate individually to predict a compute IP block(s) 132 (FIG. 1), also referred to as a core(s) of the multi-core CPUs 204 (FIG. 2) that will experience a least amount of power leakage if assigned to execute the workload (Block 630). In some examples, the one or more components operate in the manner described above with respect to FIG. 3 and include any or all of the example compute IP block ranker 313, the example power calculator 314, the example temperature delta determiner 316, the example heat pattern generator 318, the example modeler 320, the example workload analyzer 321, the example compute IP block selector 322, the example model calibrator 324, the example thread classifier 326, the example virtual skin temperature calculator 328, and the example scheduler policy override controller 330. Based on the prediction generated by one or more of the components of the prediction engine 308, the example compute IP block selector 322 (FIG. 3), selects the one or more of the compute IP blocks in the manner described with respect FIG. 3 (Block 640). In some examples, as part of the selection process, the compute IP block selector 322 makes information identifying the one or more selected/recommended compute IP blocks 132 available to the example OS scheduler 312. The example OS scheduler 312 considers using the one or more of selected/recommended compute IP blocks when assigning the workload (Block 650) in the manner described above with respect to FIG. 3.

FIG. 7 is a flow chart representative of machine readable instructions (also referred to as an example program 700) which may be executed to implement the thermally aware and power efficient (TAPE) scheduler (TAPE) 202, 302 of FIG. 2 and FIG. 3, respectively. The program 700 of FIG. 7 includes block 710 at which the example sensors/collectors 210 (see FIG. 2) collect parameters to be stored in the example parameter storage 209, 309 of FIGS. 2 and 3, respectively (Block 710). In some examples, the sensors/collectors 210 collect temperatures from the example compute IP blocks 132 and/or the example silicon dies 134, 205 (see FIG. 1 and FIG. 2, respectively) and/or collect operating frequencies of the compute IP blocks 132 as described above with respect to FIG. 3. In some examples, the example power calculator 314 generates operating power utilization values based on at least the collected temperatures and/or operating frequencies as described above with respect to the FIG. 3 (Block 720). In some examples, the operating power utilization values represent the operating power currently being consumed by the compute IP blocks 132.

In some examples, the example virtual skin temperature calculator 328 calculates virtual skin operating temperatures of the one or more example compute IP blocks 132 and/or the virtual skin operating temperatures of regions/areas on the example silicon die 134, 205 as described above with respect to the FIG. 3 (Block 730). The example modeler 320 models a flow of heat on the silicon die 134, 205 and among the compute IP blocks 132 in the manner described above with respect to FIG. 3 (Block 740). In some examples, the example heat pattern generator 318 uses information about the flow of heat based on the modeled information generate one or more heat patterns in the manner described above with respect to FIG. 3 (block 750). In some examples, the heat patterns identify regions/areas of the silicon die 134, 205 and temperatures associated with such regions/areas.

In some examples, the example delta temperature determiner 316 determines/predicts an expected change in temperature (referred to as delta temperatures) of one or more of the compute IP blocks 314 assuming the workload is assigned to such one or more of the compute IP blocks 314 (Block 760). In some examples, the example compute IP block ranker 313 ranks the compute IP blocks 132 in an order that reflects the expected/predicted power utilization, assuming the workload is assigned to the compute IP blocks 132 in the manner described above with respect to FIG. 3 (Block 770). The example compute IP block selector 322 selects one or more of the compute IP blocks from among the ranked compute IP blocks 132 in the manner described above with respect to FIG. 3 (Block 780). After selecting from among the compute IP blocks, the program 700 ends.

FIG. 8 is a flow chart representative of machine readable instructions (also referred to as an example program 800) which may be executed to implement the example thread classifier 328 (FIG. 3 and FIG. 5) of the example prediction engine 208, 308 of FIG. 2 and FIG. 3, respectively. The program 800 of FIG. 8 includes block 810 at which the example thread identifier 516 identifies threads that are currently executing on one or more of the compute IP blocks 132 (see FIG. 1) in the manner described above with respect to FIG. 5. The example thread profiler 510 profiles the identified thread in the manner described above with respect to FIG. 5 (Block 820). Based on the profiles, the example classifier 514 classifies the threads in the manner described above with respect to FIG. 5 (Block 830). The example thread selector 512 selects one or more of the threads for migration to a different one of the compute IP blocks 132 based on the thread classification in the manner described above with respect to FIG. 5 (Block 840). In some examples, the example thread identifier 516 provides information identifying the one or more of the selected threads to the OS scheduler 312 block 850) in the manner described above with respect to FIG. 5.

In some examples, the OS scheduler 312 can use the thread-identifying information to migrate the identified thread to another of the example compute IP blocks 132 in the manner described above with respect to FIG. 5. In some examples, the thread identifier 516 also identifies the selected threads to the compute IP block selector 322 of FIG. 3 which can respond by selecting a compute IP block to which the thread can be migrated, based on the ranking performed by the compute IP block ranker 313 of FIG. 3. In some examples, the compute IP blocks 132 selected for the migration operation are the compute IP blocks 132 to which the thread(s) can be migrated with limited adverse effect or no adverse effect on the power leakage experienced by the compute IP blocks 132. Thereafter, the program 800 ends.

FIG. 9 is a flow chart representative of machine readable instructions (also referred to as an example program 900) which may be executed to implement the example virtual skin temperature calculator 328, 408 of FIG. 3 and FIG. 4, respectively. The program 900 of FIG. 9 includes block 910 at which the example temperature sensors 210 collaborate with the example temperature collector 410 (FIG. 4) to collect temperatures in the manner described above with respect to FIG. 4. In some examples, the temperatures include compute IP block temperatures and/or the temperatures of various areas/regions of the silicon die on which the compute IP blocks 132 are disposed. In some examples, the example voltage frequency sensors 210B and the example voltage frequency collector 412 collaborate to collect the operating frequencies of one or more of the compute IP blocks 132 in the manner described above with respect to FIG. 4. In some examples, the example correlator 414 of the virtual skin temperature calculator 328, 408 correlates the collected temperatures and collected operating frequencies to thereby calculate virtual skin temperatures in the manner described above with respect to FIG. 4 (Block 930). Thereafter, the program 900 ends.

Figure 10:
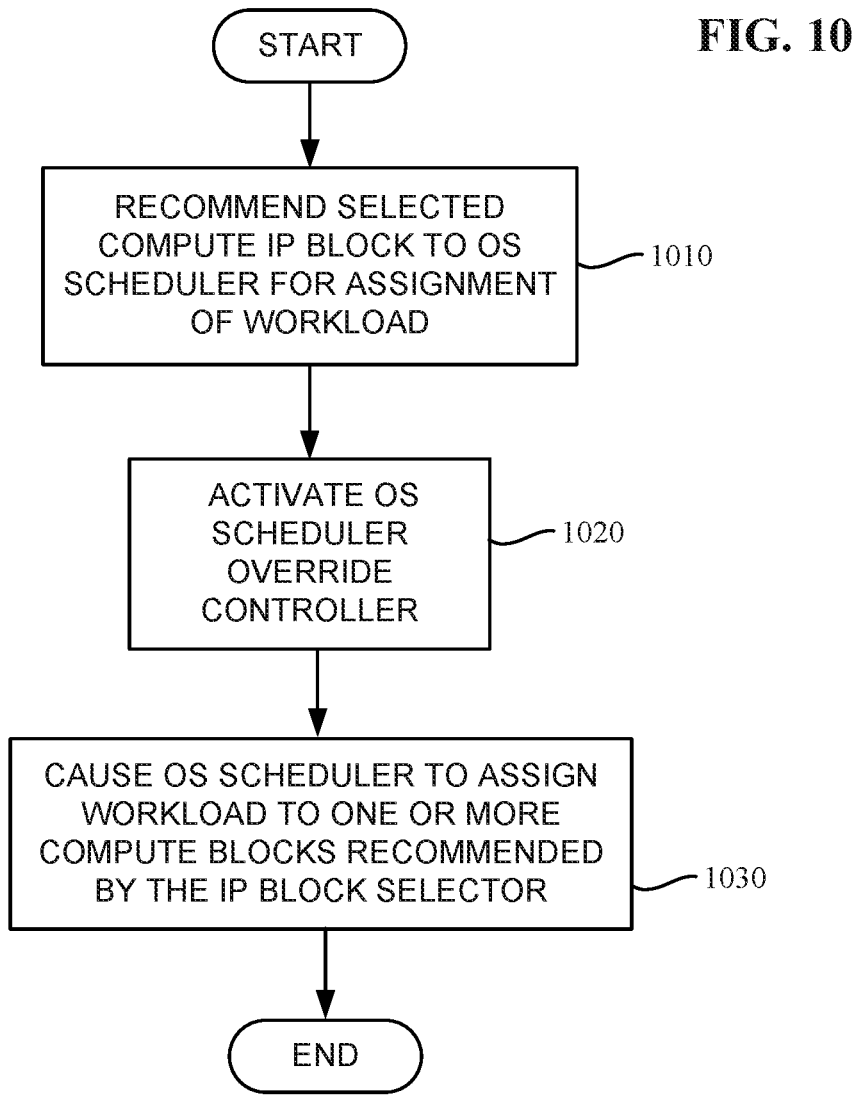
FIG. 10 is a flow chart representative of machine readable instructions which may be executed to implement the workload scheduler override controller of the prediction engine of FIG. 3.

FIG. 10 is a flow chart representative of machine readable instructions (also referred to as an example program 1000) which may be executed to implement at least a portion of the prediction engine 308 (FIG. 3). In some examples, the program 1000 includes a block 1010 at which the example compute IP block selector 322 recommends the selected one of the compute IP blocks 132 to the example OS scheduler 312 (FIG. 3) for assignment of a workload to the selected compute IP block 132 (Block 1020) in the manner described above with respect to FIG. 3. In some examples, the example OS scheduler override controller 330 overrides the compute IP selection ability of the OS scheduler 312, thereby causing the OS scheduler 312 to assign the workload to the compute IP block(s) 132 recommended by the compute IP block selector 322 in the manner described above with respect to FIG. 3. Thereafter, the program 1000 ends.

Figure 11:
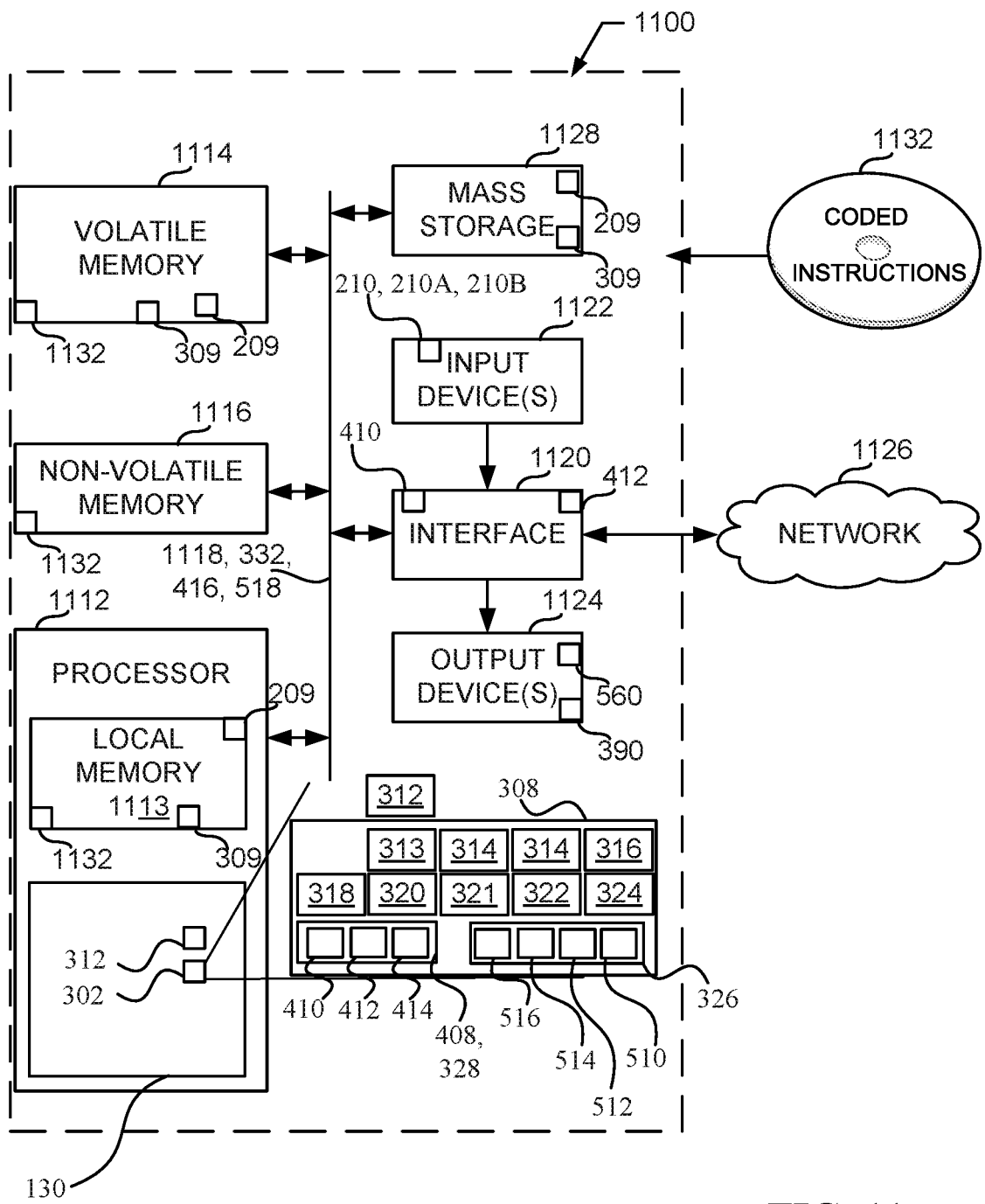
FIG. 11 is a block diagram of an example processing platform structured to execute the instructions of FIGS. 6, 7, 8, 9 and/or 10 to implement the thermally aware and power efficient workload scheduler of FIGS. 2 and/or 3.

FIG. 11 is a block diagram of an example processor platform 1100 structured to execute the instructions of FIGS. 6, 7, 8, 9, and/or 10 to implement the TAPE workload scheduler 202, 302 of FIGS. 2 and/or 3, the thread classifier 326 of FIG. 3 and/or FIG. 5, the virtual skin temperature calculator 408 of FIG. 4 and/or the OS scheduler override controller 330 of FIG. 3. The processor platform 1100 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example prediction engine 208, 308, the example OS scheduler 112, 312, the example compute IP block ranker 313, the example power calculator 314, the example temperature delta determiner 316, the example heat pattern generator 318, the example modeler 320, the example compute IP block selector 322, the example model calibrator 324, the example thread classifier 326, the example virtual skin temperature calculator 328, 408, the scheduler policy override controller 330, the example temperature collector 410, the example voltage frequency collector 412, the example correlator 414, the example thread profiler 510, the example thread selector 512, the example classifier 514, and the example thread identifier 516.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller. In some examples, the local memory 1113 (e.g., a cache), the main memory including the volatile memory 1114 of FIG. 11 can be used to implement all or portions of the example parameter storage 209 of FIG. 2 and/or the example parameter storage 309 of FIG. 3. In some examples, the bus 1118 may be used to implement any of the bus 332, the bus 416 and the bus 518.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In some examples the interface circuit 1120 is used to implement the frequency voltage collector 412 and/or the temperature collector 410.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input devices 1122 can be used to implement the sensors 210, 210A, 210B. In some examples, input devices 1122 can allow a user to set the scheduler policy override controller 330.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 11 may be stored in the mass storage device 1128, in the volatile memory 1114, in the non-volatile memory 1116, and/or on a removable non-transitory computer readable storage medium such as a CD or DVD.

Figure 12:
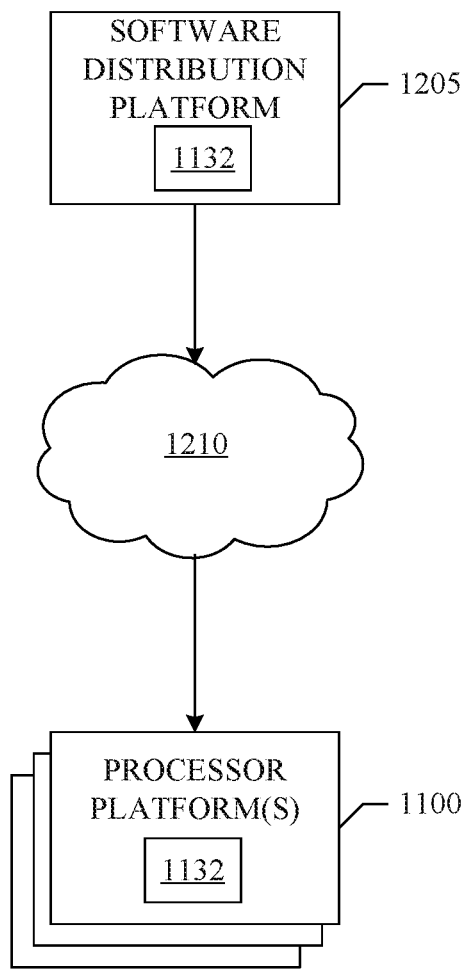
FIG. 12 is a block diagram of an example software distribution platform to distribute software (e.g., software corresponding to the example computer readable instructions of FIGS. 6, 7, 8, 9, and 10) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1132, which may correspond to the example computer readable instructions 600, 700, 800, 900, 1000 of FIGS. 6, 7, 8, 9, and 10, as described above. The one or more servers of the example software distribution platform 1205 are in communication with a network 1210, which may correspond to any one or more of the Internet and/or any example network. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1132 from the software distribution platform 1205. For example, the software, which may correspond to the example computer readable instructions 600, 700, 800, 900, 1000 of FIGS. 6, 7, 8, 9, may be downloaded to the example processor platform 1100, which is to execute the computer readable instructions 1132 to implement the thermally aware and power efficient scheduler described above. In some examples, one or more servers of the software distribution platform 1205 periodically offer, transmit, and/or force updates to the software (e.g., the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that utilize temperature and operating power information when selecting a compute IP block to which a workload is to be assigned. The disclosed methods, apparatus and articles of manufacture improve the power efficiency of a computing system by taking temperature and operating power into consideration when selecting a compute IP block to which a workload is to be assigned. Taking the temperature and the operating power into consideration when making such a selection decreases an amount of power leakage that might otherwise occur if a different compute IP block were selected. Thus, the power efficiency of the selected compute IP block is improved. The disclosed methods, apparatus and articles of manufacture are accordingly directed to one or more improvement(s) in the functioning of a computer.

Paraphrased claims to be included here after QR comments received.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Example 1 is an apparatus to schedule a workload to one of a plurality of compute blocks based on temperature. The apparatus of Example 1 includes a prediction engine to determine a first predicted temperature of a first compute block of the plurality of compute blocks and to determine a second predicted temperature of a second compute block of the plurality of compute blocks. A selector to select between the first compute block and the second compute block for assignment of the workload is also included. The selection is based on which of the first and second predicted temperatures is lower. The apparatus further includes a workload scheduler to assign the workload to the selected one of the first or second compute blocks.

Example 2 includes the apparatus of Example 1. In Example 2, the selected one of the first and second compute blocks experiences less power leakage when executing the workload than the one of the first and second compute blocks not selected.

Example 3 includes the apparatus of Example 1. In Example 3, the prediction engine is to predict the first predicted temperature and the second predicted temperature based on an existing heating pattern of a silicon die on which the first and second compute blocks are disposed. And the prediction engine is further to predict a first predicted change to the heating pattern if the workload is assigned to the first compute block, (iii) a second predicted change to the heating pattern if the workload is assigned to the second compute block.

Example 4 includes the apparatus of Example 1. In the apparatus of Example 4, the prediction engine generates the first predicted temperature based on a first operating power utilization parameter of the first compute block and generates the second predicted temperature based on a second operation power utilization parameter of the second compute block.

Example 5 includes the apparatus of Example 1. In the apparatus of Example 5, the prediction engine includes a modeler to model a thermal flow on the silicon die on which the plurality of compute blocks are disposed, and a delta temperature determiner to determine the first predicted temperature and the second predicted temperature based on the thermal flow.

Example 6 includes the apparatus of Example 5. In the apparatus of Example 6, the prediction engine includes a delta temperature determiner to determine a change in temperature between a third temperature of the first compute block and the first temperature of the first compute block. In Example 6, the third temperature is determined before the workload is assigned to any of the plurality of compute blocks.

Example 7 includes the apparatus of Example 1. In Example 7, the apparatus includes a heat pattern generator to generate a heat pattern. The heat pattern indicates respective temperatures of respective regions of a silicon die. In Example 7, the plurality of compute blocks are disposed on the silicon die.

Example 8 includes the apparatus of Example 1. In the apparatus of Example 8, the prediction engine includes a delta temperature determiner to determine an expected first change in the first temperature based on assignment of the workload to the first compute block, and to determine an expected second change in the second temperature based on assignment of the workload to the second compute block.

Example 9 include the apparatus of Example 1. In the apparatus of Example 9, the prediction engine determines the first predicted temperature of the first compute block and the second predicted temperature of the second compute block based on a heating pattern of a silicon die on which the plurality of compute blocks are disposed.

Example 10 includes the apparatus of Example 1. In the apparatus of Example 10, the prediction engine includes a power calculator to calculate a first operating power of the first compute block and a second operating power of the second compute block. In addition, the apparatus of Example 10 includes a delta temperature determiner to determine a first change in temperature of the first compute block and a second change in temperature of the second compute block based on the first and second operating powers, respectively.

Example 11 includes the apparatus of Example 1. In the apparatus of Example 11, the prediction engine further includes a compute block ranker to rank the plurality of compute blocks based on respective power efficiencies of corresponding ones of the plurality of compute.

Example 12 is a non-transitory computer readable medium including instructions that, when executed, cause one or more processors to at least determine a first predicted temperature of a first compute block of a plurality of compute blocks and a second predicted temperature of a second compute block of the plurality of compute blocks. The instructions of Example 12 further cause the one or more processors to select one of the first compute block or the second compute block for assignment of the workload. The selection is based on which of the first and second predicted temperatures is lower. Further, the instructions cause the one or more processors to schedule the workload to the selected one of the first and second compute blocks.

Example 13 includes the non-transitory computer readable medium of Example 12. In Example 13, the instructions further cause the one or more processors to generate a first heat pattern of a silicon die, the plurality of compute blocks disposed on the silicon die and, based on the first heat pattern, predict a second heat pattern of the silicon die and predict a third heat pattern of the silicon die. The second heat pattern is based on assuming a workload is assigned to a first compute block of the silicon die and the third heat pattern is based on assuming the workload is assigned to a second compute block of the silicon die. The instructions also cause the one or more processors to assign a workload to at least one of the first compute block or the second compute block based on the predicted second heat pattern and the predicted third heat pattern.

Example 14 includes the non-transitory computer readable medium of Example 13. In Example 14, the instructions further cause the one or more processors to perform an initial calibration of a compact transient thermal model using a system computational fluid dynamics model. In addition, the instructions cause the one or more processors to update the compact transient thermal model as utilization of the plurality of compute blocks of the silicon die changes. Further, the instructions of Example 14 cause the one or more processors to generate the first heat pattern, the second heat pattern, and the third heat pattern using the compact transient thermal model.

Example 15 includes the non-transitory computer readable medium of Example 14. In Example 15, the first, second, and third heat patterns reflect temperatures at locations on the silicon die due to workloads performed by the plurality of compute blocks. In Example 15, the instructions further cause the one or more processors to, based on a fourth heat pattern, determine a temperature at a first location of the silicon die at which a third compute block is disposed and at a second location of the silicon die that is adjacent to the third compute block. Further, the instructions cause the one or more processors to determine whether to assign a second workload to the third compute block based on the temperature at the first location and at the second location.

Example 16 includes the non-transitory computer readable medium of Example 14. In Example 16, the instructions cause the one or more processors to generate a plurality of heat patterns including the second and third heat patterns based on the compact transient thermal model, and to generate a new heat pattern to reflect the new workload assignment, when a workload is assigned to any of the compute blocks. In addition, the instructions cause the one or more processors to rank the plurality of compute blocks based on the new heat pattern. Respective ones of the plurality of compute blocks are ranked based on respective real-time power efficiencies of corresponding ones of the plurality of compute blocks.

Example 17 includes the non-transitory computer readable medium of Example 13. In Example 17, the workload is a first workload, and the instructions further cause the one or more processors to recommend, to an operating system scheduler, that a second workload be assigned to a third compute block based on a fourth heating pattern, and to override a policy of the operating system scheduler to cause the operating system scheduler to assign the second workload based on the recommendation.

Example 18 includes the non-transitory computer readable medium of Example 13. In Example 18, the first heat pattern reflects a pattern of respective temperatures on respective regions of the silicon die caused by existing workloads executed by one or more of the compute blocks.

Example 19 includes the non-transitory computer readable medium of Example 13. In Example 19, the instructions further cause the one or more processors to compare a map of respective locations of corresponding ones of the plurality of compute blocks on the silicon die to the first heat pattern to correlate respective temperatures of the first heat pattern to respective ones of the compute blocks of the silicon die.

Example 20 is a method to schedule a workload to one of a plurality of compute blocks based on temperature. The method of Example 20 includes determining, by executing an instruction with at least one processor, a first predicted temperature of a first compute block of the plurality of compute blocks and a second predicted temperature of a second compute block of the plurality of compute blocks. The method also includes selecting one of the first compute block or the second compute block for scheduling of the workload based on which of the first and second predicted temperatures is lower, and scheduling the workload to the selected one of the first or second compute blocks.

Example 21 includes the method of Example 20. In the method of Example 21, the first predicted temperature and the second predicted temperature are predicted based on (i) a heating pattern of a silicon die on which the first and second compute blocks are disposed, (ii) a first predicted change to the heating pattern if the workload is scheduled to the first compute block, and (iii) a second predicted change to the heating pattern if the workload is scheduled to the second compute block.

Example 22 includes the method of Example 20. In the method of Example 22, at least a first operating power utilization parameter of the first compute block and a second operation power utilization parameter of the second compute block are used to generate the first predicted temperature and the second predicted temperature, respectively.

Example 23 includes the method of Example 20. The method of Example 23, further includes modeling a thermal flow on the silicon die on which the plurality of compute blocks are disposed. In Example 23, the first predicted temperature and the second predicted temperature are based on the thermal flow.

Example 24 includes the method of Example 23. The method of Example 24 further includes determining a change in temperature between a third temperature of the first compute block and the first predicted temperature of the first compute block. In Example 24, the third temperature is determined before the workload is scheduled to any of the plurality of compute blocks.

Example 25 includes the method of Example 20 and further includes generating a heat pattern, the heat pattern to indicate respective temperatures of corresponding regions of a silicon die. In Example 25, the plurality of compute blocks are disposed on the silicon die.

Example 26 includes the method of Example 20 and further includes determining a predicted first change in the first predicted temperature based on assignment of the workload to the first compute block, and determining a predicted second change in the second predicted temperature based on assignment of the workload to the second compute block.

Example 27 includes the method of Example 20. In the method of Example 27 the first predicted temperature of the first compute block and the second predicted temperature of the second compute block are determined based on a heating pattern of a silicon die on which the plurality of compute blocks are disposed.

Example 28 includes the method of Example 20 and further includes calculating a first operating power of the first compute block and a second operating power of the second compute block, and determining a first change in temperature of the first compute block and a second change in temperature of the second compute block based on the first and second operating powers, respectively.

Example 29 includes the method of Example 20, and further includes ranking the plurality of compute blocks based on respective power efficiencies of corresponding ones of the plurality of compute blocks.

What is claimed is:

1. An apparatus to schedule a workload, the apparatus comprising:
   interface circuitry;
   instructions; and
   processor circuitry to operate based on the instructions to:
   generate a heat pattern associated with a plurality of compute blocks of a compute device; and
   assign the workload to at least one of a first compute block or a second compute block of the plurality of compute blocks, the workload to also utilize a third compute block of the plurality of compute blocks, the assignment based on the heat pattern, a first distance between the first compute block and the third compute block, and a second distance between the second compute block and the third compute block.

2. The apparatus of claim 1, wherein the assigned at least one of the first compute block or the second compute block is to experience less power leakage when executing the workload than the one of the first and second compute blocks not selected.

3. The apparatus of claim 1, wherein the processor circuitry is to predict a first predicted temperature of the first compute block and a second predicted temperature of the second compute block based on (i) the heating pattern, (ii) a first predicted change to the heating pattern if the workload is assigned to the first compute block and (iii) a second predicted change to the heating pattern if the workload is assigned to the second compute block.

4. The apparatus of claim 1, wherein the processor circuitry is to:
   generate a first predicted temperature of the first compute block based on a first operating power utilization parameter of the first compute block; and
   generate a second predicted temperature of the second compute block based on a second operation power utilization parameter of the second compute block.

5. The apparatus of claim 1, wherein the processor circuitry is to:
   model a thermal flow on a silicon die associated with the plurality of compute blocks; and
   determine a first predicted temperature of the first compute block and a second predicted temperature of the second compute block based on the thermal flow.

6. The apparatus of claim 5, wherein the processor circuitry is to determine a change in temperature between a third temperature of the first compute block and the first predicted temperature of the first compute block, the third temperature determined before the workload is assigned to any of the plurality of compute blocks.

7. The apparatus of claim 1, wherein the heat pattern is to indicate respective temperatures of corresponding regions of a silicon die, the plurality of compute blocks on the silicon die.

8. The apparatus of claim 1, wherein the processor circuitry is to:
   predict a first change of a first temperature of the first compute block based on assignment of the workload to the first compute block; and
   predict a second change of a second temperature of the second compute block based on assignment of the workload to the second compute block.

9. The apparatus of claim 1, wherein the processor circuitry is to determine a first predicted temperature of the first compute block and a second predicted temperature of the second compute block based on the heating pattern.

10. The apparatus of claim 1, wherein the processor circuitry is to:
    calculate a first operating power of the first compute block and a second operating power of the second compute block; and
    determine a first change in temperature of the first compute block and a second change in temperature of the second compute block based on the first and second operating powers, respectively.

11. The apparatus of claim 1, wherein the processor circuitry is to rank the plurality of compute blocks based on respective power efficiencies of corresponding ones of the plurality of compute blocks.

12. One or more non-transitory computer readable medium comprising instructions to cause one or more processors to at least:
    perform an initial calibration of a compact transient thermal model using a system computational fluid dynamics model;

update the compact transient thermal model based on changes in utilization of a plurality of compute blocks, the plurality of compute blocks on a silicon die;

generate a first heat pattern of the silicon die based on the compact transient thermal model;

generate a second heat pattern of the silicon die and a third heat pattern of the silicon die based on the compact transient thermal model and the first heat pattern, the second heat pattern based on a first assumption that a workload is assigned to a first compute block of the plurality of compute blocks and the third heat pattern based on a second assumption that the workload is assigned to a second compute block of the plurality of compute blocks; and assign a workload to at least one of the first compute block or the second compute block based on the second heat pattern and the third heat pattern.

13. The one or more non-transitory computer readable medium of claim 12, wherein the first, second, and third heat patterns reflect temperatures at locations on the silicon die due to workloads performed by the plurality of compute blocks, and the instructions are to cause the one or more processors to:

based on a fourth heat pattern, determine a temperature at a first location of the silicon die at which a third compute block is disposed and at a second location of the silicon die that is adjacent to the third compute block; and determine whether to assign a second workload to the third compute block based on the temperature at the first location and at the second location.

14. The one or more non-transitory computer readable medium of claim 12, wherein the instructions are to cause the one or more processors to:

generate a plurality of heat patterns including the second and third heat patterns, the plurality of heat patterns generated based on the compact transient thermal model;

generate a new heat pattern to reflect a new workload assignment when a new workload is assigned to any of the compute blocks; and rank the plurality of compute blocks based on the new heat pattern, respective ones of the plurality of compute blocks ranked based on respective real-time power efficiencies of corresponding ones of the plurality of compute blocks.

15. The one or more non-transitory computer readable medium of claim 12, wherein the workload is a first workload, and the instructions are to cause the one or more processors to:

recommend that a second workload be assigned to a third compute block based on a fourth heating pattern; and override a policy to cause the second workload to be assigned based on the recommendation.

16. The one or more non-transitory computer readable medium of claim 12, wherein the first heat pattern reflects a pattern of respective temperatures on respective regions of the silicon die caused by existing workloads executed by one or more of the compute blocks.

17. The one or more non-transitory computer readable medium of claim 12, wherein the instructions are to cause the one or more processors to compare a map of respective locations of corresponding ones of the plurality of compute blocks on the silicon die to the first heat pattern to correlate respective temperatures of the first heat pattern to corresponding ones of the compute blocks of the silicon die.

18. A method to schedule a workload, the method comprising:

determining, by executing an instruction with at least one processor, a first predicted temperature of a first compute block of a plurality of compute blocks of a compute device based on a sensed board temperature of the compute device and a first operating frequency of the first compute block;

determining, by executing an instruction with the at least one processor, a second predicted temperature of a second compute block of the plurality of compute blocks based on the sensed board temperature and a second operating frequency of the second compute block; and scheduling the workload to at least one of the first compute block or the second compute block based on the first predicted temperature and the second predicted temperature.

19. The method of claim 18, further including determining a third predicted temperature of the first compute block and a fourth predicted temperature of the second compute block based on (i) a heating pattern of a silicon die associated with the first and second compute blocks, (ii) a first predicted change to the heating pattern if the workload is scheduled to the first compute block and (iii) a second predicted change to the heating pattern if the workload is scheduled to the second compute block.

20. The method of claim 18, further including:

determining a third predicted temperature of the first compute block based on a first operating power utilization parameter of the first compute block; and determining a fourth predicted temperature of the second compute block based on a second operation power utilization parameter of the second compute block.

21. The method of claim 18, further including, modeling a thermal flow on a silicon die associated with the plurality of compute blocks; and determining a third predicted temperature of the first compute block and a fourth predicted temperature of the second compute block based on the thermal flow.

22. The method of claim 21, further including determining a change in temperature between a fifth temperature of the first compute block and the third predicted temperature of the first compute block, the fifth temperature determined before the workload is scheduled to any of the plurality of compute blocks.

23. The method of claim 18, further including generating a heat pattern, the heat pattern to indicate respective temperatures of corresponding regions of a silicon die, the plurality of compute blocks on the silicon die.

24. The apparatus of claim 1, wherein processor circuitry is to select the one of the first compute block or the second compute block based which one of the first distance or the second distance is larger.

* * * * *